United States Patent [19]

Walker

[11] Patent Number: 4,878,696

[45] Date of Patent: Nov. 7, 1989

[54] HEXAGONAL JUNCTION ADAPTER FOR CLAMPING SYSTEM

[75] Inventor: William R. Walker, Rochester, Mich.

[73] Assignee: Hydro-Craft, Inc., Rochester Hills, Mich.

[21] Appl. No.: 255,823

[22] Filed: Oct. 11, 1988

[51] Int. Cl.$^4$ ............................ F16L 3/10; F16L 3/22
[52] U.S. Cl. .................................... 285/61; 285/137.1; 285/158
[58] Field of Search ...................... 285/61, 64, 62, 417, 285/158, 137.1; 248/68.1

[56] References Cited

U.S. PATENT DOCUMENTS

| | | |
|---|---|---|
| 2,359,846 | 10/1944 | Hayman ......................... 285/158 X |
| 3,254,399 | 6/1966 | Zahuranec ....................... 285/64 X |
| 3,397,431 | 8/1196 | Walker . |
| 3,414,220 | 12/1968 | Walker . |

OTHER PUBLICATIONS

Parker Fluid Connectors Catalog No. 4350 (Dec. 1984).

*Primary Examiner*—Thomas F. Callaghan
*Attorney, Agent, or Firm*—Harness, Dickey & Pierce

[57] ABSTRACT

A junction adapter having a hexagonally-shaped central support portion or body is disclosed for use with a conventional plural line clamping assembly. The hexagonal shape of the adapter body provides many advantages over the rectangularly-shaped bodies of prior art junction adapters. Among the advantages are that such adapters can be easily and very economically made from hexagonal bar stock, using conventional automatic screw machines. The use of the hexagonal bar stock results in a junction adapter formed of one piece of metal and thus provides an adapter that does not have any connection joint that can break away. The hexagonal adapter can be oriented in any position and even be slightly misaligned while still being secured firmly within a plural line clamping assembly.

Three embodiments of the hexagonally-shaped adapter are disclosed, and each includes a hexagonally-shaped body, two co-axial connection members, and an axially arranged fluid passages through the junction adapter. Each of the three embodiments employs a different type of male or female threaded connection on its connection members. Two of the three embodiments also include wrench flats on the connection members that allow the hexagonal adapter to be firmly grasped by a wrench so to avoid transmitting torques through to the plural line clamping assembly when a fluid line is being connected to the adapter member.

10 Claims, 20 Drawing Sheets

HEXAGONAL JUNCTION ADAPTER FOR CLAMPING SYSTEM

BACKGROUND OF THE INVENTION

The present invention relates to a junction adapter for use with a conventional plural line clamping system in which the adapter has a hexagonally shaped body and is formed from hexagonal bar stock.

Plural line clamping systems are widely used in the hydraulics industry whenever it is necessary to connect plural fluid lines to a machine. The system provides a mounting device for holding the connectors that connect the fluid lines from the machine to the fluid lines heading to the source of fluid power. The plural line clamping system provides a secure mount that will not shake loose or rattle. Plural line clamping systems are disclosed in U.S. Pat. Nos. 3,397,431 and 3,414,220, both issued in the name of William R. Walker and assigned to the assignee of present invention HydroCraft, Inc., of Rochester Hills, Michigan. The disclosures of these two just-mentioned patents are hereby incorporated herein by reference, due to the pertinence thereof to the present invention. Since their introduction, plural line clamping systems such as those available from HydroCraft, Inc. and sold under the trademark "MULTI-CLAMP", have become quite popular and are widely used in the machine tool industry to route and secure hydraulic and pneumatic piping, tubing and other lines in an orderly, neat and efficient manner. The plural line clamping system in general provides a simple, sturdy mounting for the adapters and is widely used in almost any hydraulics application where it is necessary to have plural fluid lines. There are currently several tens of thousands of MULTI-CLAMP$^{TM}$ installations in use in the United States and other countries, and MULTI-CLAMP$^{TM}$ assemblies in several standard sizes have been sold for years by the assignee.

The basic arrangement of the common plural line clamping system can be seen from reviewing the above-cited patents or by reviewing the prior art FIGS. 1 and 2. As can be seen in FIG. 1, a metal plural line clamping assembly 20 in general includes a stamped U-shaped top channel 22 and an opposed stamped U-shaped bottom channel 24. Of course, the channels could also be disposed vertically, in which case there would be right and left channels. The channels are formed with semi-cylindrical collars 26, 28 that support prior art junction adapter members 30 at annular collar portions 31 formed on the adapter. It will be understood that the assembly shown in FIG. 1 is for example only and that there could be additional sets of collar pairs further along the channel members. As can be seen from the prior patents, the plural line clamping system will typically have four to ten or more sets of collars with each collar pair being adapted to support an adapter member 30. The prior art adapter members 30 were formed of a first rectangular portion or body 32 and a second cylindrical portion 34. As shown in FIG. 1, even through the bodies 32 within any one plural line clamping assembly 20 are the same over-all size, and the collar portions 31 are the same size, the remainder of cylindrical portions 34 need not be the same size. For convenience, the prior art adapters 30 are sometimes referred to herein as rectangular adapters since they have rectangular bodies 32.

The first rectangular portion 32 of each adapter 30 fits snugly into the U-shaped channels 22 and 24 and acts as a central support portion. Each side of each cylindrical portion 34 has the collar portion 31 and the threaded portion 36 formed on its outer surface. The cylindrical portion 34 is connected to the rectangular portion by brazing or gluing and thus had a joint 35 at the interface of the rectangular portion 32 and the cylindrical portion 34. Alternatively, a hole was drilled in body 32 and portion 34 for a pin 42 that would interlock the rectangular body 32 and cylindrical member 34 to prevent relative movement therebetween. Fluid passage 40 passes through the entire extend of the cylindrical portion and acts to connect as a passage way for fluid passing through lines sealingly connected to either end of member 34, and running to a machine actuator from a source of power, a control valve, or the like.

Cylindrical stacking nuts 44 having a pre-determined length extend between the channels 22 and 24 to separate the channels 22 and 24 and secure each adapter 30 within the plural line clamping assembly 20, as is explained more fully below. Bolts 46 extend through holes 48 formed in the channels 22,24 and are secured in screw thread holes within the stacking nuts 44, as shown in FIGS. 1 and 2, to lock the channel members together and rigidly secure the adapter members 30 within the plural line clamping assembly.

As can best be seen from FIG. 2, the body 32 of prior art adapters 30 fit snugly within the plural line clamping assembly and had abutment faces that rest on the channel members 22, 24 and another set of abutment faces that rest on the stacking nuts 44. As can also be seen from FIG. 2, the distance along the length of stacking nuts 44 from the channel member 22 to the channel member 24 is greater than the distance between the two stacking nuts 44. Due to this, the adapter member needs to have a body 32 of substantially rectangular shape with two different dimensions between the opposed pairs of abutment faces. In other words, the height and width of body 32 were distinctly different. Thus, when inserting the prior art adapter member into the plural line clamping system an operator has to align the rectangular walls in the right orientation so that the stacking nut abutment faces are aligned with the stacking nuts and the channel abutment faces are aligned with the channels.

Although the plural line clamping systems shown in the prior patents have been very successful, there are problems encountered with the prior art adapter members. In particular, the rectangular central support portion 32 had to be finely machined or cast so as to accurately fit between the bolts 26 and the channel members 22, 24, In addition, the adapter members have to be accurately positioned within the plural line clamping system in order for the rectangular central support portion to fit in the space provided for it. If the adapter member is askew within the plural line clamping system, the bolts cannot be tightened, since there would not be contact between all four sides of the rectangular central support portion 32, the bolts 26 and channel members 22, 24. During assembly, it is necessary to properly position the prior art adapters so that the channel engagement faces and the bolt engagement faces are properly presented relative to the channel members and bolts. This orientation step adds to the time required to assemble the plural line clamping system.

The main problems encountered with the prior art rectangular members had to do with manufacturing. The manufacture of the prior art adapter 30 was a multi-step, complicated process. Several different methods have been employed over the years to make the prior art adapters. In the original process, the first step was to machine a rectangular block of steel into the height, width and thickness required for the body 32 so that it would be received by the channels of a standard MULTI-CLAMP™ system. The next step was to drill a hole through the rectangular member 32 to accommodate the cylindrical member 34. Cylindrical bar stock was then machined to form the collars 31 and threads on and hole through the cylindrical member 34. The cylindrical member 34 was then placed or pressed in the hole and brazed to hold it in place in the rectangular member.

The second process used to make the prior art adapter 30 involved using a powdered metal casting for the rectangular block 32. Such a casting was formed to the appropriate dimensions with the central hole therein being pre-formed to size as part of the casting process. This technique eliminated the need for machining the rectangular body 32. Since powder metal did not braze well, a conventional epoxy capable of withstanding temperatures in excess of 200 degrees F. was applied to the joint 35 to secure the machine cylindrical member 34 to the rectangular body 32. However, the use of a powder metal body 32 also introduced other problems. On occasion,, particularly in those models of the junction adapters requiring a hole through the rectangular block which was large relative to the overall size of the powered metal body 32, the body 32 would on occasion shatter as the cylindrical member 34 was being pressfit into the body 32.

Even with the use of brazing or an adhesive, the cylindrical member 34 would on occasion come loose from the rectangular member 27 in the field. The adapter member is typically used to connect two pulsating high-pressure fluid lines and thus is subject to a great deal of vibration. If the cylindrical member 34 is even slightly loose from the rectangular member 32, there can be a great deal of resulting rattling and noise. As is widely known, factories are already quite noisy, and the additional noise resulting from the rattling adapter members is undesirable.

A third process for making the prior art adapters involved using the roll pin 42 shown in FIG. 2 in place of the brazing operation or the epoxy glue operation to lock the cylindrical member 34 in place with respect to the rectangular The roll pin 42 obviously offers a technique for positively securing the cylindrical member 34 in place with respect to the rectangular member 32. However, the production costs associated with the use of a roll pin is quite high due to the extra machining and assembly steps it requires.

A fourth process for making the prior art adapters 30 involves a onepiece construction technique which does not suffer from the problem of assembling the rectangular body 32 and cylindrical member 34, nor does it suffer from the problem of body 32 separating from cylindrical member 34. In this fourth process, a cold forged blank is made in the general configuration of, but which has overall dimensions slightly larger than, the desired finished adapter. The body portion 32 of the blank is then machined to size, and thereafter the cylindrical portion 34 is machined to produce the collar support portions 31, the thread connector portions 36 and the bore 40. One of the problems with economically producing the prior art junction adapters from a one-piece blank is that they cannot be readily machined on the most economical type of machinery, namely automatic screw machines. Also, it is considerably more difficult and expensive to machine a forged part then it is a non-forged part made of mild steel or powdered metal. Moreover, the surface finish in the ends of adapter members made from forged blanks was of a reduced quality. On occasion, this has presented problems, especially where the connection on the end of the cylindrical portion 34 of the adapter member 30 is a male 37 degree or 45 degree flare. Thus, the use of a forged one-piece blank did not produce either the economic savings or desired quality adapter member which the assignee of the present invention had hoped for when it developed such adapter members.

Automatic screw machines are widely available that will work on cylindrical bar stock; however, a cylindrical body portion alone cannot adequately secure the adapter member against movement within the entire plural line clamping system Thus, it is necessary to also have the associated rectangular member 32. The prior art adapters cannot be made as far as the inventor is aware of from rectangular bar stock using standard automatic screw machines since they are not equipped to work with rectangular stock.

A necessary feature for any new plural line clamping adapter member is that it must be a retrofit into the existing plural line clamping assemblies. There are currently several tens of thousands of MULTI-CLAMP ™ installations in service in the United States and other countries, and each includes several collar pairs each supporting an adapter. Also, the manufacturer of MULTI-CLAMP ™ assemblies, its distributors and a number of their larger customers each maintain a substantial inventory of MULTI-CLAMP ™ systems or assemblies. In addition, conventional plural line clamping assemblies come in several different standard sizes of channels, with each different size channel requiring a different size body or central support section. To change the dimensions of the conventional plural line clamping assemblies would require tooling changes for each such size channel amounting to several millions of dollars for each different size. Thus, any new adapter must either fit into the existing plural line clamping assemblies or it will not be successful in the marketplace. It is not realistic to expect the industry to replace completed design or existing multi-clamp assemblies just in order to accommodate a new improved adapter.

In light of the foregoing problems,it is a principal object of the present invention to solve the problems of the prior art by providing high a quality onepiece adapter member for use within a conventional plural line clamping system that can be machined economically in relatively few steps.

It is another object of the present invention to provide an adapter member that is relatively inexpensive to construct and has a good surface finish for improving seals and reducing leaks at the fittings. It is further an object of the present invention to form an adapter member than can be secured within the channels of a plural line clamping system in a variety of angular orientations and need not be accurately positioned within the plural line clamping system. It is yet another object of the present invention to provide a one-piece adapter member that will not break apart due to vibrations and become noisy.

SUMMARY OF THE INVENTION

The aforementioned objects of the present invention are achieved by forming a one-piece adapter member from a piece of hexagonal mild steel bar stock. The adapter of the present invention is formed with very few machining steps and requires only commonly available machinery. An important aspect of such one-piece adapter members is that are much less expensive to manufacture than prior art adapters, and moreover do not even have any brazed or glued joints that can break.

These objects of the present invention have been solved in a way that surprised workers in the art, including even the inventor of the present invention who is the individual who pioneered the plural line clamping assembly art. The present invention takes advantage of the fact that hexagonal bar stock is available in standard dimensions and that such bar stock is readily machineable using standard automatic screw machines. The inventor of the present invention was surprised to find out that when he obtained a piece of hexagonal bar stock having a cross-sectional point-to-point length equal to the length of a stacking nut, that the corresponding cross-sectional face-to-face distance of the hexagonal bar stock substantially equalled the distance between adjacent stacking nuts in a standard plural line clamping assembly using the stacking nut in question. these relationships are best shown in FIG. 4. Individuals employed by the assignee of the present invention and by companies such as the assignee's distributors of MULTI-CLAMP TM systems were also similarly surprised that a hexagonally-shaped body or central support portion made from the hexagonal bar stock would fit within the dimensions of the MULTI-CLAMP TM system so as to provide simultaneous contact as shown in FIG. 4 with both channel members and both stacking nut members.

The present invention provides a one-piece junction adapter having a body section with a hexagonal cross-section for use with a standard plural line clamping assembly that comprises two opposed generally U-shaped channel members with collar portions for supporting the adapter members. Stacking nuts are disposed between and help separate the two channel members. A stacking nut is provided between the adjacent adapter members to secure and separate the adapter members. The crosssectional size of the hexagonal bar stock used to make the one-piece adapter is selected so that its point-to-point distance corresponds to the length of the stacking nuts. As explained above, this also results in face-to-face distance which are equal to the distance between adjacent stacking nuts. Thus, when the plural line clamping assembly is tightened, there is line contact along the two points or vertices of the hexagonal adapter member at each channel member and plane contact along two opposed faces of the hexagonal junction adapter at the two stacking nuts. Even if the hexagonal adapter member is slightly misaligned, there will still be four line contacts, with two of the contacts being at the two channel members and two of the contacts being at the two stacking nuts, as will be further explained via FIG. 5.

Three embodiments of the one-piece hexagonally-shaped junction adapter of the present invention are disclosed in detail below. The term "one-piece" is used herein to mean machined and/or formed from a single piece of material so as to eliminate the need to resort to weld, glue or use of fasteners such as roll pins to hold together. The hexagonal cross-sections thereof each comprise six equal sides with intermediate equal angles between them. The three embodiments accommodate various combinations of male or female connection members and in addition two of the three embodiments have screw thread connector portions that provide wrench flats that will aid in tightening fluid lines to the adapter member.

In various embodiments, the hexagonally shaped adapter members of the present invention preferable employ standard SAE, NPT or straight screw threads in order to make them universally adaptable to various fluid line fittings or threaded pipe.

In addition, the first embodiment of the present invention discloses dual female threaded connections that are unique in the plural line clamping junction adapter art. Standard threaded male fitting connection members are widely available in the market that enable a variety of fluid lines to be connected to a female connector member. The first embodiment of the present invention would be useful with any one these commercially available male fitting connection members. The first embodiment of the present invention can be utilized to accommodate any one of the fittings normally associated with these commercially available connection members including straight thread, flat-faced or O-ring fittings. This provides a leak-free fitting that achieves the benefits of allowing universal connection of fluid lines to the adapter while at the same time avoiding the leaking that is normally associated with the use of multiple connection members. The inventor is not aware of any other female threaded adapters available for use with conventional plural line clamping systems.

These and other features and objects of the present invention can be best understood when read in conjunction with the attached specification and drawings.

DETAILED DESCRIPTION OF THE PREFERRED EMBODIMENTS

Figure 1:
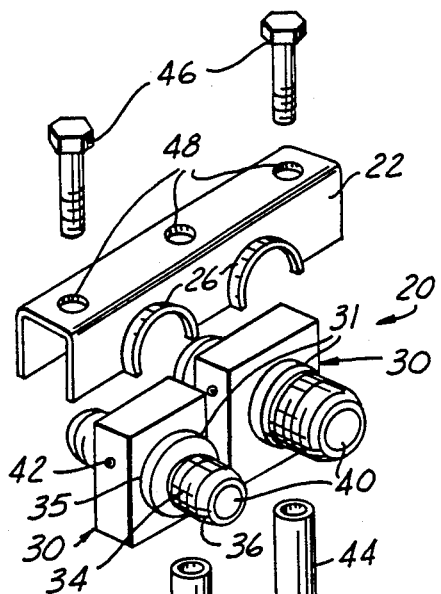
FIG. 1 is a exploded perspective view of a portion of a conventional plural line clamping system or assembly for clamping up two prior art adapter members shown therewith.
Figure 2:
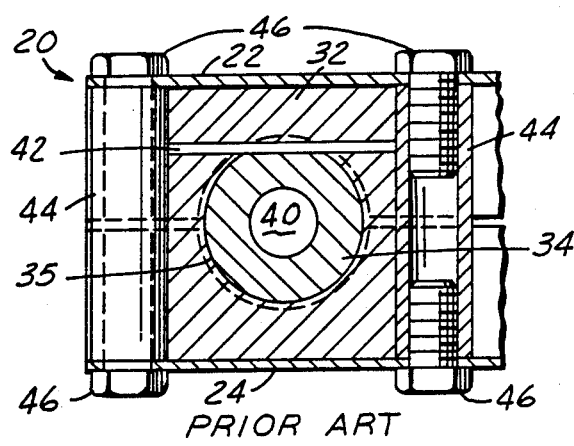
FIG. 2 is a cross-section through the plural line clamping system shown in FIG. 1 showing the placement of the rectangular body of one of the prior art adapters in the plural line clamping system.
Figure 3A:
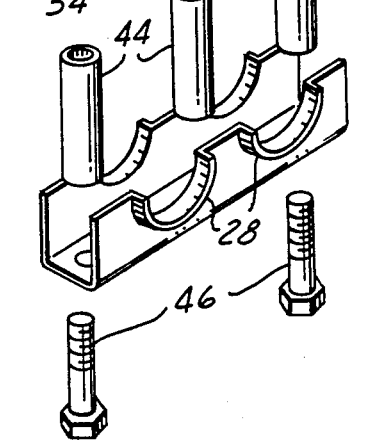
FIG. 3A is a perspective view of a first embodiment of the junction adapter of the present invention.

The first embodiment of the present invention can be understood upon consideration of FIGS. 3A, 3B, 4 and 5. As shown in FIG. 3A the first embodiment of the present invention is an adapter member 50 that comprises a hexagonal central support portions 52 and two cylindrical collar portions 54, one on each axial side of the central support portion 52. Hexagonal female threaded connection portions 56 are disposed next to the collar portions 54 on the sides thereof opposite of the central portion 52. SAE or straight threads are formed at locations 58 on the interior of this threaded connection portion 56. The axial extent of thickness of the central support portion 52 is approximately equal to the distance between opposed interior side walls of the U formed by each of the channel members 22 and 24 so that the channel members act to axially restrain the adapter member.

Figure 3B:
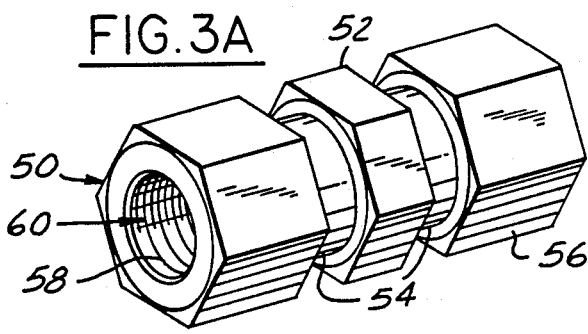
FIG. 3B is a side elevational view of the first embodiment of the present invention, with the upper half thereof shown in cross-section.
Figure 3B:
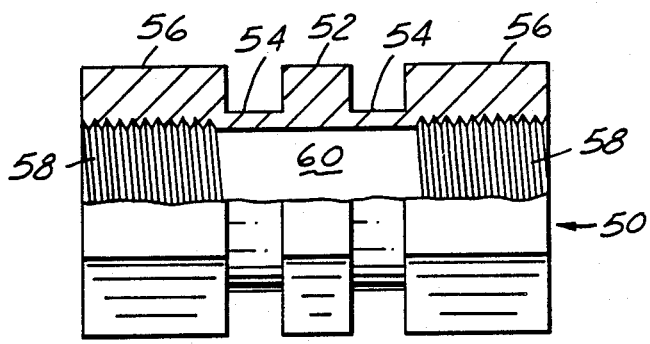

As shown in FIG. 3B the first embodiment has reading left to right as shown in FIG. 3B, a first threaded connection portion 56, a first collar portion 54, the central support portion 52, a second collar portion 54, and a second threaded portion 56. Pipe threads are shown at locations 58 within the threaded connection portions 56 and a fluid line 60 extends through the entire axial extent of the adapter member. All six faces of the central support portion of the hexagonal junction adapter member 50 are of equal size and each intermediate angle between adjacent faces is also equal. Similarly, the six faces of each threaded portion 56 are of equal size with respect to one another with equal angles therebetween.

Figure 4:
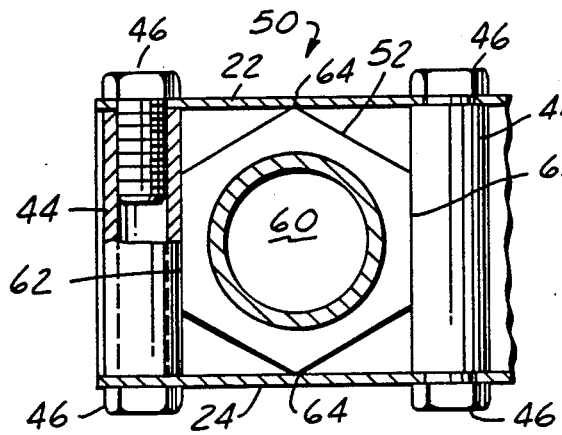
FIG. 4 is a cross-section similar to that shown in FIG. 2, but illustrating an adapter as disclosed by the present invention.

As shown in FIG. 4 the hexagonal adapter member 50 fits snugly within the plural line clamping assembly 20. The central support portion 52 is captured within the plural line clamping assembly between the two channel members 22, 24 and adjacent stacking nuts 44, and forms line contacts at locations 64 with the channel members 22, 24 along the points of the hexagonal adapter body 52. In addition there is plane contact with the stacking nuts 44 along two opposed faces 62 of the hexagonal junction adapter member 50. It is to be understood that the hexagonal junction central support portion 52 is not only captured at all four locations as shown in FIG. 4 but that its axial extent or thickness is also approximately equal to the axial extent of the U-shaped recess within the channel members 22, 24 so that the channel members also act to axially restrain the central support portion 52.

Figure 5:
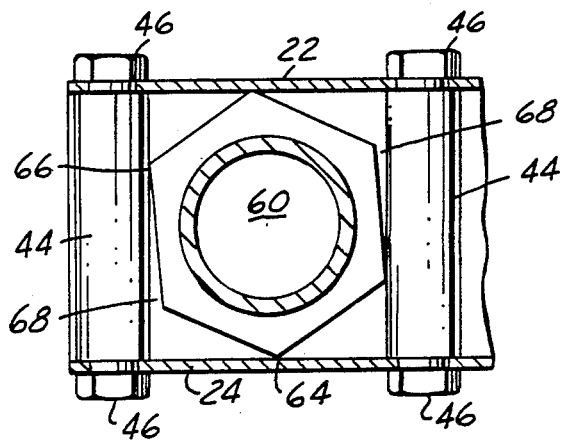
FIG. 5 is a view similar to FIG. 4, but showing the adapter of the present invention slightly misaligned within the plural line clamping assembly.

Since the central support section 52 of adapter 50 has six equal faces or sides an assembler merely needs to place the adapter member into the channel members and insert the bolts 46 into stacking nuts 44. Any two opposed sides of the six sides of the hexagonal junction adapter can be oriented along the stacking nuts 44. FIG. 5 shows an additional feature of the present invention, that is, ability of the junction adapter 50 to be secured even when slightly misaligned. In FIG. 5, the hexagonal adapter member does not have plane face contact at all opposed faces 62, but instead due to the misalignment has line contact on the two sides 62 with the stacking nuts 44 at locations 66. So even though there are gaps or clearances at locations 68, the hexagonal section 52 can still be securely held within the space between the stacking nuts 44 and the channel members 22, 24. As shown in FIG. 5, the hexagonal adapter member is slightly misaligned (perhaps due to rotation of the adapter, misplacement of the stacking nuts, etc.) but there will still be line contact at 64 with the channel members 22, 24, and rather than the plane face contact at the stacking nuts 44, there will be line contact 66 with the stacking nuts 44. Due to this arrangement, the hexagonal adapter of the present invention will be securely held within the plural line clamping multi-clamp assembly 20 even f it is inserted slightly misaligned. This feature makes assembly much quicker since an assembler need not worry about exact orientation or extremely accurate positioning of the adapter member.

Figure 6A:
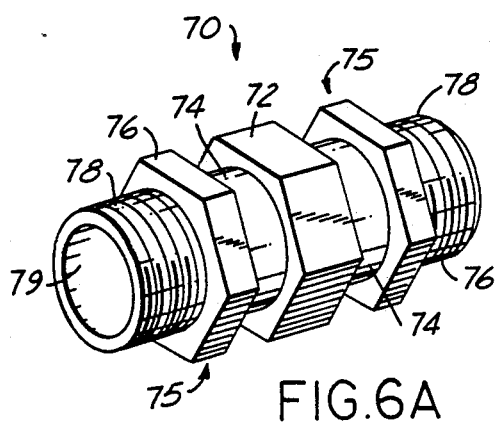
FIG. 6A is a perspective view of a second embodiment of the adapter of the present invention.
Figure 6B:
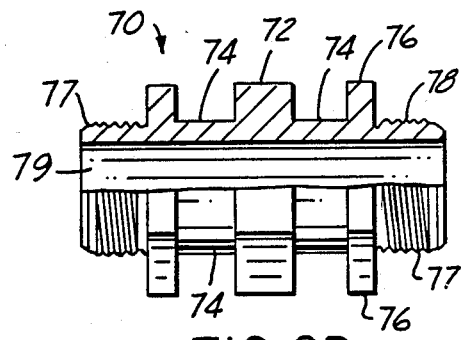
FIG. 6B is a side elevational view of the second embodiment of the present invention, with the upper half thereof shown in cross-section.

FIGS. 6A and 6B show a second embodiment of the hexagonal adapter of the present invention for use in the plural line clamping assembly 20. The second embodiment 70 is similar to the first embodiment 50 and has a central support portion 72 and a collar portion 74 identical to the first embodiment. The threaded connection portions of the second embodiment 70 are different than in the first embodiment. Each portion 75 includes a first radially large hexagonally shaped section 76 and a second outjutting male connector section 78 formed with threads on its outside circumference. The outermost edge 77 is beveled to form a sealing surface for a flared tube. This style of male connector section is well-known, and is shown for example in FIGS. 8 and 9 of the aforementioned U.S. Pat. No. 3,414,220.

As can be seen most clearly in FIG. 6B, the fluid path 79 extends throughout the entire extent of the adapter member. As can also be seen from FIG. 6B, the collar support portion 74 is radially smaller than the central support portion 72 or the first radially large section 76 of the screw connection portion 75. FIG. 6B also shows that the male connector section 78 is also radially smaller than the first radially large section 76 of the screw connection portion.

The first two embodiments 50 and 70 of the present invention both possess threaded connection portions that extend outwardly from the channels 22 and 24 of the plural line clamping system 20. Any two opposed faces of the portion 56 or section 76 of the first two embodiments thus are accessible for use as wrench flats while attaching a fluid line to the threaded connector portion. This provides an important benefit since it allows tightening of the fluid line without passing torque into the plural line clamping assembly 20, which might stress and/or loosen the various members. Due to the wrench flats on the connection portion of either of the first two embodiments, an operator can simply lock a wrench upon the wrench flats and hold the wrench against the torque transmitted during the attachment and tightening of the fluid line. In addition, the wrench flats allow connection of the fluid line prior to tightening of the bolts 46 of the plural line clamping assembly 20.

Figure 7A:
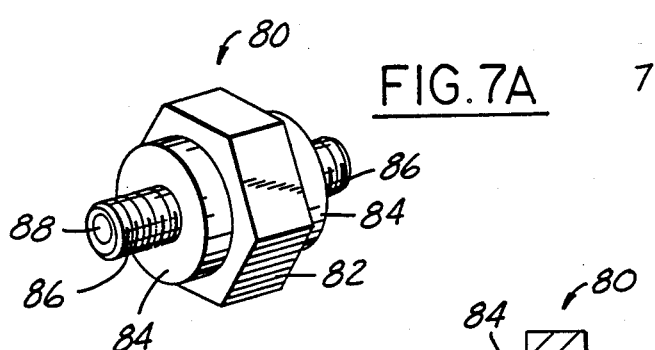
FIG. 7A is a perspective view of a third embodiment of the present invention.
Figure 7B:
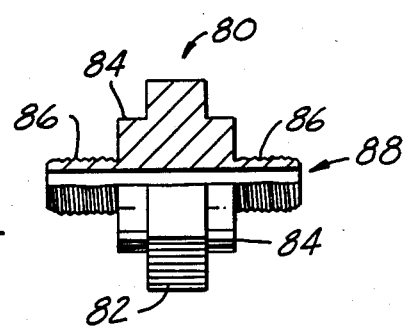
FIG. 7B is a side elevational view of the third embodiment of the present invention, with the upper half thereof shown in cross-section.

FIGS. 7A and 7B disclose a third embodiment 80 of the hexagonal adapter of the present invention. The third embodiment has central support portion 82 and collar portion 84 similar to the other embodiments but is formed with male connection members 86 extending directly from the collar portion 84, which are formed with screw threads. As can be seen from FIG. 7B, the fluid path 88 passes through the entire axial extent of this third embodiment also.

The hexagonally-shaped adapter members 50, 70, 80 of the present invention can all be made out of commonly available hexagonal bar stock using standard automatic screw machines. Any suitable material can be used such as 1008 or 1010 mild steel. Hexagonal bar stock is readily available in a variety of SAE standard sizes that will correspond to the dimensions needed to have the central support section 52, 72 or 82 of the adapter 50, 70 or 80 fit into the various sizes of channels 22, 24 of the plural line clamping system 20. In other words, it is not necessary to machine the exterior surfaces, that is the faces, of the central support section or body of any of the three embodiments. In making the first embodiment 50, the hexagonal bar stock is machined in order to form the collar portions 54 therein and drilled out to form bore 58. Standard threads are then formed within the two threaded connector portions 56.

the second embodiment 70 of the hexagonal adapter is formed in a similar fashion. The collar support portions 74 are formed exactly the same way as in the first embodiment; however, the threaded sections 78 are formed slightly differently. The hexagonal bar stock is first turned to remove additional material to leave the male thread portion 78 and screw threads are then formed on the outer periphery of the male portion 58 and the passage 79 bored or drilled out.

The third embodiment 80 of the hexagonal adapter is formed by first turning the hexagonal bar stock to remove material so as to leave the collar support portions 84. The bar stock is then turned to remove additional material in the area of the male connection members 86. Threads are then formed on the outer surface of the male connection members and the passage 88 bored or drilled out.

Further details as to the techniques used to machine the three junction adapters 50, 70 and 80 need not be given here, since they are all conventional and would be readily apparent to any one of ordinary skill in automatic screw machine art. Once the adapters 50, 70 or 80 has been completely formed, it is then preferably cadmium-plated or zinc-plated for corrosion protection, using well-known plating techniques. By these methods, a one-piece adapter member is economically obtained.

Three working embodiments of the present invention have been disclosed; however, a worker in the art would realize that certain modifications would be within the scope of this invention. For instance, any combination of conventional or suitable male or female threads could be used on the connection portions of any particular adapter member, 37 degree or 45 degree flared fitting connection may also be used. In addition, the type of connection means used are not limited to threaded connectors but could include any other style of connector presently known or later developed, as may be required or desired to connect up the fluid lines. The intended scope of the present invention can best be understood by consideration of the appended claims, including all fair equivalents thereof.

I claim:

1. A junction adapter for a standard plural line clamping assembly of the type having (1) a plurality of channels each of generally U-shaped cross-section and each provided with two leg sections and a connecting section therebetween, and provided with semicylindrical collar portions formed in the leg sections at the outer most extent thereof, and (2) stacking nut means, disposed between and separating said first and second channels in a position such that the U-shapes of the two members face each other, the adapter comprising:

a hexagonal-shaped central support portion adapted to be mounted within the channels of the standard plural line clamping assembly;

two cylindrical collar support portions each formed radially smaller than said central support portion and formed at each axial side thereof and adapted to be mounted between two opposed semi-cylindrical collar portions of a standard plural line clamping assembly;

two connection portions each formed at the end of said collar support portion opposite said central support portion and provided with connector means to sealingly receive a fluid line connection, said connection portions each including at least a first section which is of the same hexagonal shape and size in cross-section as the central support portion, whereby each said section of the connection portion is usable as wrench flats when connecting fluid lines to the adapter, and wherein said central support portion, collar support portions and connection portions are formed from a single piece of hexagonal bar stock material, and have a common fluid passage extending therethrough.

2. An adapter as recited in claim 1, wherein said each connector means includes male threads formed on and constituting an integral part of its respective connection portion.

3. An adapter as recited in claim 1, wherein said connector means each include female threads extending along at least part of the fluid passage extending therethrough.

4. An adapter as recited in claim 1, wherein:
said connection portions each include a second section formed adjacent to the first section thereof, which is radially smaller than said first section and is generally circular in cross-section.

5. An adapter as recited in claim 4, wherein each said radially smaller second section includes male threads integrally formed thereon.

6. An adapter as recited in claim 5, wherein each said radially smaller second section includes a beveled outer edge for forming a sealing surface for a flared tube.

7. A plural line clamping assembly comprising:
first and second channel members, each such channel member being of generally U-shaped cross-section and having two leg sections and a connecting section therebetween, and provided with semi-cylindrical collar portions formed in the leg sections at the outer most extent thereof, said first and second channel members being aligned to be secured to each other in a position such that the U-shapes of the two members face each other;

at least two elongated stacking nut members of the same first length being disposed generally within the U-shaped channels of the first and second channel members and extending between the two said channel members, said stacking nuts being disposed on each side of said collar portions of said channel members, and each said stacking nut being spaced from the next adjacent stacking nut by a second length;

a junction adapter being formed with a central support portion of hexagonal cross-section and sized to be received in said U-shaped channels of said first and second channel members and having a fluid passage extending axially through the entire length of said adapter, said adapter being received between and abutting both channel members and two adjacent stacking nut members, said adapter being dimensioned so that the distance between two opposed points of the hexagonal junction adapter member is substantially equal to said first length and the distance between any two opposed faces of said hexagonal junction adapter is equal to said second length; and bolt members extending through both said first and second channel members and into engagement with said stacking nuts to cause the channel members to bear against and capture the hexagonally shaped adapter member between the channel members and the two adjacent stacking nut member, said hexagonally shaped adapter member being a one-piece member formed with cylindrical collar portions on both axial sides of said central support portion, said cylindrical collar portions being radially smaller than the central support section of the adapter member and being received within said semi-cylindrical collar portions, said hexagonal adapter member also being formed with threaded connection portions at each axial side of said collar portions opposite said central support portions.

8. A clamping assembly as recited in claim 7, wherein said threaded connection portions each include at least one section thereof that is hexagonal in cross-section and of the same outer dimensions as said central support portion.

9. A clamping assembly as recited in claim 8, wherein the first section of each said threaded connection portion extends along substantially the entire length of its threaded connection portion, and is formed with female threads along at least part of the fluid passage extending therethrough.

10. A clamping assembly as recited in claim 8, wherein each threaded connection portion has a second section radially smaller than its first section, said second section including male threads thereon.

* * * * *